(12) United States Patent
Mills et al.

(10) Patent No.: US 9,276,387 B2
(45) Date of Patent: Mar. 1, 2016

(54) SEALED PLUG-IN CIRCUIT BREAKER ASSEMBLY

(75) Inventors: Patrick Wellington Mills, Bradenton, FL (US); James Michael McCormick, Bradenton, FL (US)

(73) Assignee: Labinal, LLC, Denton, TX (US)

( * ) Notice: Subject to any disclaimer, the term of this patent is extended or adjusted under 35 U.S.C. 154(b) by 172 days.

(21) Appl. No.: 14/127,731

(22) PCT Filed: Jun. 20, 2012

(86) PCT No.: PCT/US2012/043261
§ 371 (c)(1),
(2), (4) Date: Dec. 19, 2013

(87) PCT Pub. No.: WO2012/177704
PCT Pub. Date: Dec. 27, 2012

(65) Prior Publication Data
US 2014/0111909 A1    Apr. 24, 2014

Related U.S. Application Data

(60) Provisional application No. 61/499,358, filed on Jun. 21, 2011.

(51) Int. Cl.
*H02B 1/04* (2006.01)
*H01H 9/04* (2006.01)
(Continued)

(52) U.S. Cl.
CPC . *H02B 1/04* (2013.01); *H01H 9/04* (2013.01); *H02B 1/28* (2013.01); *H02B 1/46* (2013.01); *H01H 13/06* (2013.01); *H02B 1/056* (2013.01)

(58) Field of Classification Search
CPC .............. H02B 1/04; H02B 1/14; H02B 7/00; H01R 4/30; H01R 4/02; H01H 9/28; H01H 50/02; H01H 50/14; H05K 5/06; G01R 19/0092
USPC ............ 361/679.01, 600, 605, 611–613, 624, 361/627, 629, 634–637, 641–648, 653, 361/656–658; 174/50, 50.5, 50.51–50.54, 174/520, 17 VA, 35 R, 541, 561, 67; 312/223.1, 223.2, 223.3, 265; 200/50, 200/293, 296, 297, 335, 332, 330; 218/34, 218/35, 157; 335/2, 202, 172, 190, 23, 167; 439/76.1, 76.2, 147, 810, 887, 874
See application file for complete search history.

(56) References Cited

U.S. PATENT DOCUMENTS 2,037,900 A * 4/1936 Hastings ........................ 361/631
2,158,477 A * 5/1939 Olley ............................ 174/650
(Continued)

FOREIGN PATENT DOCUMENTS

| CN | 1264911 | 8/2000 |
| EP | 2254207 | 11/2010 |
| FR | 2444355 | 7/1980 |

OTHER PUBLICATIONS

United States Patent and Trademark Office, International Search Report and Written Opinion, Sep. 21, 2012, pp. 7.
(Continued)

*Primary Examiner* — Michail V Datskovskiy
(74) *Attorney, Agent, or Firm* — Rankin, Hill & Clark LLP

(57) ABSTRACT

A sealed plug-in circuit breaker panel has an enclosure defining a sealed interior portion. The enclosure includes a housing, a face plate removably coupled to the housing and a front seal member disposed between the face plate and the housing such that the face plate and the housing are sealingly engaged. The panel further includes an electrical bus structure coupled to the housing, a plurality of first plug-in members coupled to the bus structure and a number of circuit breakers disposed in the enclosure. Each circuit breaker includes a manual operator and at least a pair of second plug-in members which are electrically coupled to corresponding first plug-in members. The manual operator protrudes through and extends from a respective aperture formed in the face plate. The panel further includes a number of feeders and load connectors electrically coupled to the bus structure.

10 Claims, 5 Drawing Sheets

(51) Int. Cl.
  *H02B 1/28* (2006.01)
  *H02B 1/46* (2006.01)
  *H01H 13/06* (2006.01)
  *H02B 1/056* (2006.01)

(56) References Cited

U.S. PATENT DOCUMENTS

| | | | | |
|---|---|---|---|---|
| 2,335,233 | A * | 11/1943 | Bush | 361/647 |
| 3,142,732 | A * | 7/1964 | Clarke et al. | 200/50.32 |
| 3,210,608 | A * | 10/1965 | Appleton | H01H 9/042 174/151 |
| 3,210,609 | A * | 10/1965 | Appleton | H01H 9/042 174/151 |
| 3,486,150 | A * | 12/1969 | Clark | 337/43 |
| 4,084,875 | A | 4/1978 | Yamamoto | |
| 4,110,719 | A * | 8/1978 | Kirkup | 337/46 |
| 4,157,582 | A | 6/1979 | Myers | |
| 4,791,258 | A * | 12/1988 | Youtz et al. | 200/302.1 |
| 5,057,810 | A | 10/1991 | Raudabaugh | |
| 6,317,311 | B1 * | 11/2001 | Middlehurst et al. | 361/637 |
| 6,762,662 | B2 * | 7/2004 | Lee et al. | 335/2 |
| 6,900,405 | B2 * | 5/2005 | Abraham et al. | 200/538 |
| 7,170,376 | B2 * | 1/2007 | Mills et al. | 335/202 |
| 7,848,085 | B2 | 12/2010 | Gerber | |
| 7,907,389 | B2 | 3/2011 | Baird et al. | |
| 8,223,475 | B2 * | 7/2012 | Baird et al. | 361/643 |
| 8,328,575 | B2 * | 12/2012 | Meux et al. | 439/349 |
| 2006/0291148 | A1 * | 12/2006 | Kelly et al. | 361/637 |
| 2008/0093927 | A1 | 4/2008 | Ewing et al. | |
| 2012/0229958 | A1 * | 9/2012 | Hughes | 361/673 |

OTHER PUBLICATIONS

Office action filed in Chinese Patent Application No. 2012800303681.

* cited by examiner

SEALED PLUG-IN CIRCUIT BREAKER ASSEMBLY

CROSS-REFERENCE TO RELATED APPLICATION

This application claims the benefit of U.S. Provisional Patent Application Ser. No. 61/499,358, filed Jun. 21, 2011, entitled "SEALED PLUG-IN CIRCUIT BREAKER ASSEMBLY," which is incorporated by reference herein.

BACKGROUND

1. Field

The disclosed concept pertains generally to circuit breakers and, more particularly, to circuit breaker assemblies, such as, for example, circuit breaker panels for a number of circuit breakers.

2. Background Information

Circuit breakers are used, for example, in aircraft electrical systems where they not only provide overcurrent protection but also serve as switches for turning equipment on and off. Aircraft or subminiature circuit breakers, for instance, are typically relatively small to accommodate the relatively high-density layout of aircraft circuit breaker panels, which make circuit breakers for numerous circuits accessible to a user. Aircraft electrical systems can consist, for example, of hundreds of circuit breakers, each of which is used for a circuit protection function as well as a circuit disconnection function through a push-pull handle.

The circuit breaker push-pull handle is moved from in-to-out in order to open the corresponding load circuit. This action may be either manual or, else, automatic in the event of an overload or fault condition. If the push-pull handle is moved from out-to-in, then the load circuit is re-energized. If the load circuit had been automatically de-energized, then the out-to-in operation of the push-pull handle corresponds to a circuit breaker reset action.

Such circuit breakers typically include a threaded bezel. A suitable fastener, such as a nut and washer, mount the circuit breaker at a corresponding opening of an aircraft circuit breaker mounting panel. The push-pull handle passes through the bezel to the user side of the mounting panel. The circuit breaker also typically includes line and load screw terminals disposed on the opposite maintenance side of the mounting panel.

Aircraft circuit breaker panels are typically packaged and exposed to the environment in which they are installed. For example, in military aircraft applications the circuit breaker panel may be installed in non-pressurized areas of the aircraft repeatedly exposed to, among other environmental conditions, moisture, salt fog corrosion, sand and dust. These conditions may reduce the reliability of circuit breaker panels.

There is room for improvement in circuit breaker assemblies.

SUMMARY

These needs and others are met by embodiments of the disclosed concept, which are directed to a sealed plug-in breaker panel. Among other benefits, the sealed plug-in breaker panel provides an environmentally resistant panel that can be reliably placed in harsh environmental conditions.

As one aspect of the disclosed concept, a sealed plug-in circuit breaker panel is provided. The sealed plug-in circuit breaker panel comprises an enclosure defining an interior portion sealed from an exterior portion. The enclosure includes: a housing; a face plate removably coupled to the housing, the face plate having a number of apertures formed therein; and a front seal member disposed between the face plate and the housing in a manner such that the face plate and the housing are sealingly engaged. The breaker panel further comprises: an electrical bus structure coupled to the housing; a plurality of first plug-in members coupled to the electrical bus structure; a number of circuit breakers disposed in the enclosure; a number of feeders having a number of terminals provided on, and sealed to the enclosure; and a number of load connectors provided on and sealed to the enclosure. Each of the number of circuit breakers comprises a manual operator and at least a pair of second plug-in members, the manual operator protruding through and extending from a corresponding one of the number of apertures of the face plate. Each of the second plug-in members are electrically coupled to a corresponding one of the first plug-in members. Each terminal of the number of terminals is electrically coupled to the electrical bus structure and structured to provide power to the bus structure. Each of the load conductors has a number of load pins electrically coupled to the bus structure.

The face plate may include a number of collar portions each disposed about a respective aperture of the number of apertures and each circuit breaker of the number of circuit breakers may include: a neck portion disposed about the manual operator and a breaker seal member provided about the neck portion in a manner such that the neck portion and the collar portion of the corresponding one of the number of apertures are sealingly engaged.

At least one of the neck portion and the collar portion may include a circular groove, the circular groove being structured to position the breaker seal member for sealing the neck portion and the collar portion.

The face plate may include a number of captive fasteners which removably engage the housing such that the face plate is removably coupled to the housing.

The enclosure may further include a rear cover removably coupled to the housing and a rear seal member disposed between the rear cover and the housing in a manner such that the rear cover and the housing are sealingly engaged.

The housing may include a number of captive fasteners which removably engage the rear cover such that the rear cover is removably coupled to the housing.

Each terminal of the number of terminals may comprise a post formed from a conductive material, which passes through the rear cover, the post being coupled and sealed to the rear cover via the interaction of a circular jam nut and a circular o-ring, the circular o-ring being compressed between the circular jam nut and the real cover.

Each load connector of the number of load connectors may be coupled to, and sealed with, the rear cover member via an o-ring or a gasket member.

The number of load pins of each load connector may be electrically coupled to the electrical bus structure by a ribbon cable.

At least one of the housing and the rear cover may include a directional vent structured to vent pressure from the Interior portion of the enclosure.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
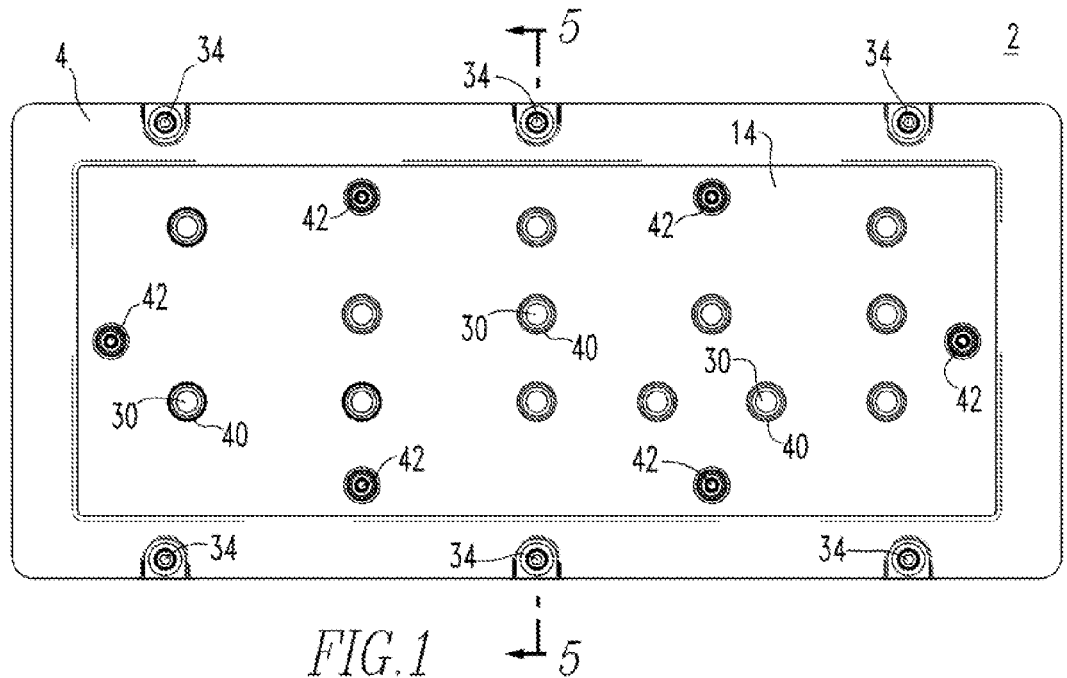
FIG. 1 is a front view of a sealed plug-in circuit breaker assembly according to an example embodiment of the disclosed concept.

As employed herein, the term "number" shall mean one or an integer greater than one (i.e., a plurality).

As employed herein, the statement that two or more parts are "coupled" together shall mean that the parts are joined together either directly or joined through one or more intermediate parts.

As employed herein, the term "fastener" refers to any suitable connecting or tightening mechanism expressly including, but not limited to, screws, bolts, nuts (e.g., without limitation, lock nuts) and combinations thereof.

The disclosed concept is described in association with subminiature or aircraft circuit breakers, although the disclosed concept is applicable to a wide range of different circuit breakers for a wide range of different applications. Such circuit breakers can be employed, for example and without limitation, in aircraft alternating current (AC) electrical systems having a typical frequency of about 400 Hz, but can also be used in direct current (DC) systems. It will also become evident that the disclosed concept is applicable to other types of circuit breaker panels including those used in AC systems operating at other frequencies; to larger circuit breakers, such as miniature residential or commercial circuit breakers; and to a wide range of circuit breaker applications, such as, for example, without limitation, residential, commercial, industrial, aerospace, and automotive. As further non-limiting examples, both AC (e.g., without limitation, 120, 220, 480-600 VAC) operation at a wide range of frequencies (e.g., without limitation, 50, 60, 120, 400 Hz, and higher or lower frequencies) and DC operation (e.g., without limitation, 42 VDC) are possible.

Referring to FIGS. 1-7, a circuit breaker assembly, such as the example sealed plug-in circuit breaker panel 2, is shown. The circuit breaker panel 2 includes a housing 4, an electrical bus structure 6 (FIG. 5) coupled to the housing 4, a number of first plug-in members 8 coupled to the electrical bus structure 6 (FIG. 5), a plurality of circuit breakers 10 (thirteen circuit breakers are shown in the illustrated example embodiment, although any suitable number can be employed), a rear cover 12 coupled to a rear portion (not numbered) of the housing 4, and a face plate 14 coupled to a front portion (not numbered) of the housing 4. It is to be appreciated that the housing 4, face plate 14, and rear cover 12 generally form an enclosure (not numbered) which, as will be understood from the further details below, defines an interior portion that is environmentally sealed from the exterior thereof, and thus also the surrounding environment in which the circuit breaker panel 2 is disposed.

Figure 2:
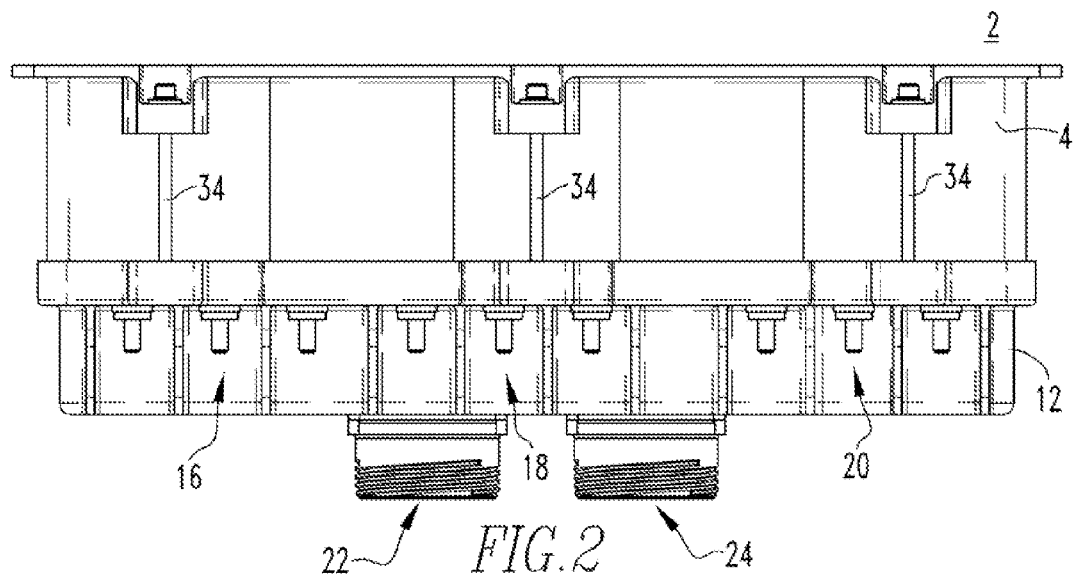
FIG. 2 is a top view of the sealed plug-in circuit breaker assembly of FIG. 1.
Figure 3:
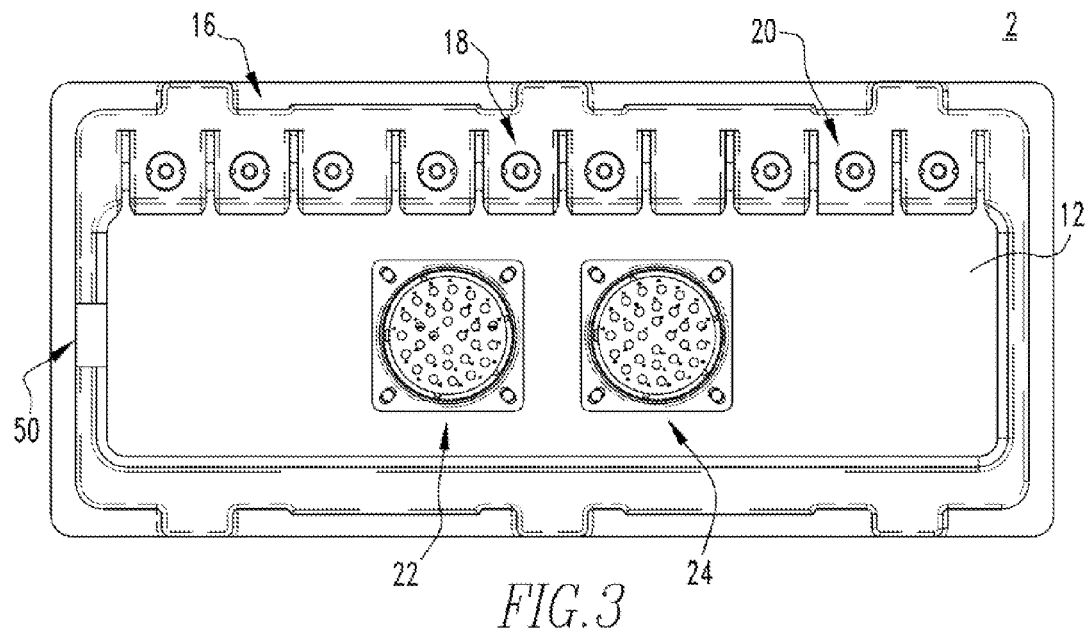
FIG. 3 is a rear view of the sealed plug-in circuit breaker assembly of FIG. 1.
Figure 4:
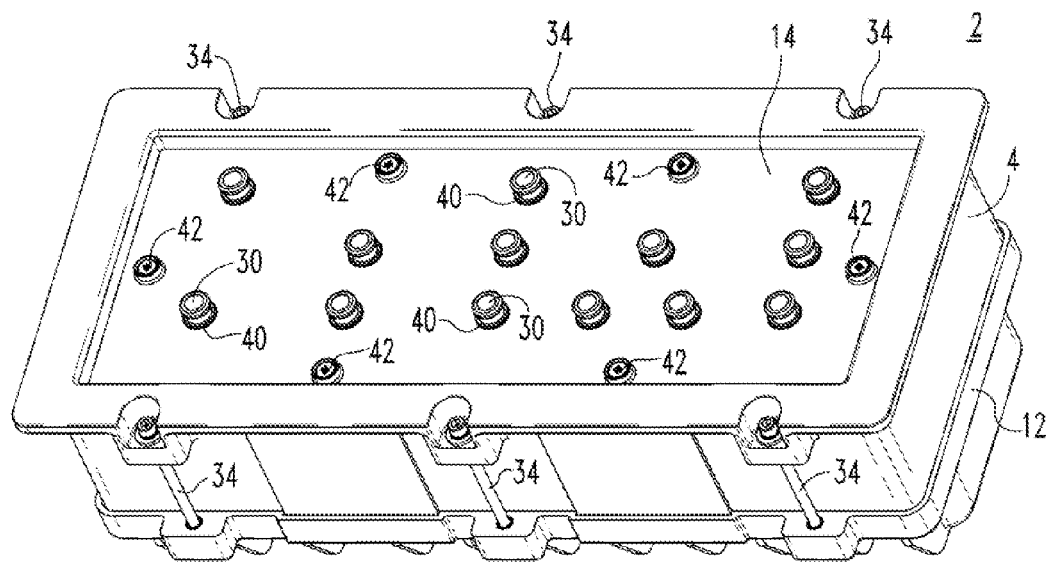
FIG. 4 is a front isometric view of the sealed plug-in circuit breaker assembly of FIG. 1.
Figure 5:
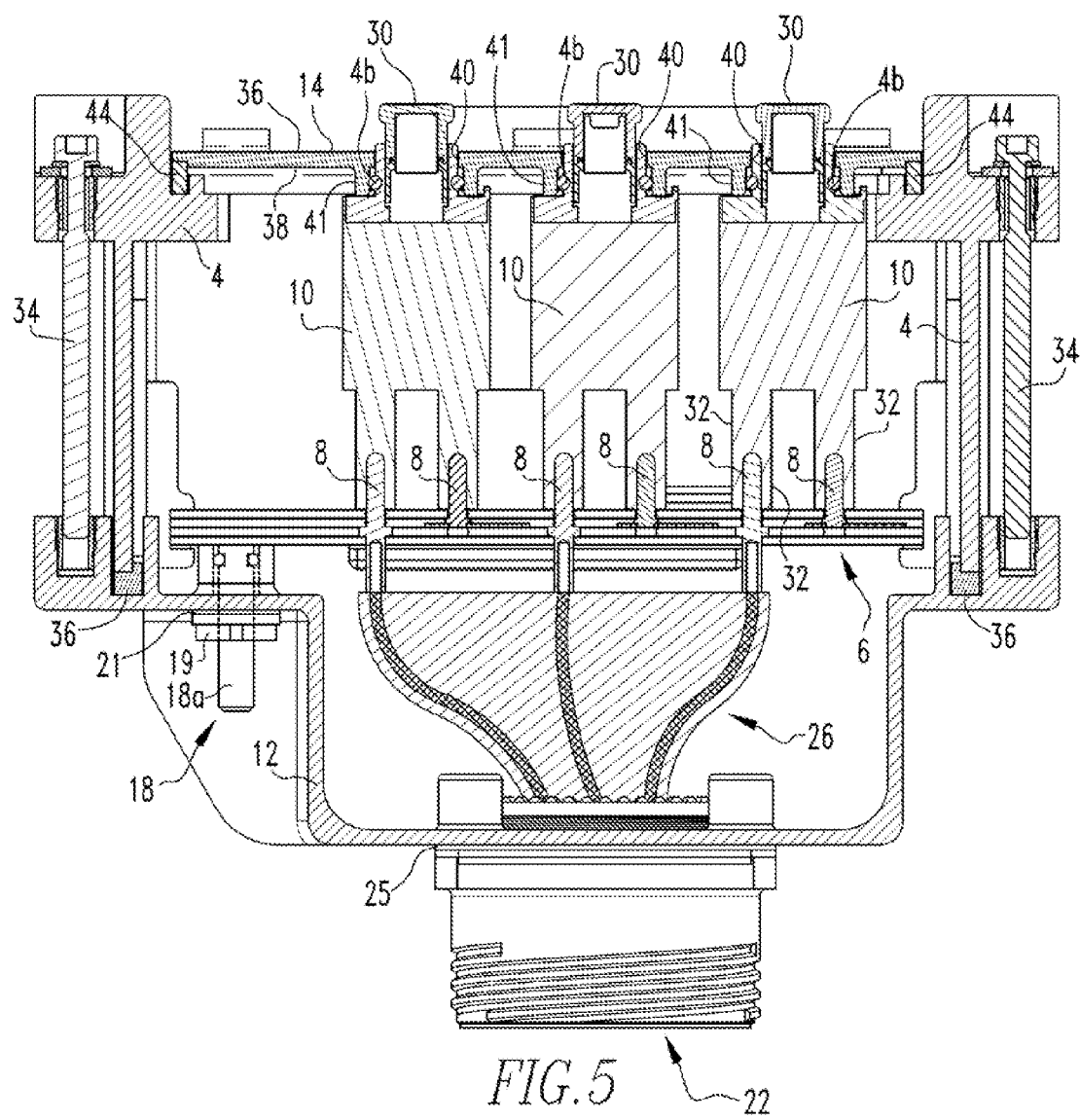
FIG. 5 is a cross-sectional view of the sealed plug-in circuit breaker assembly of FIG. 1 taken along line 5-5 of FIG. 1.

Bus structure 6, shown in the sectional view of FIG. 5, can be the same as or similar to the bus structure described in detail in U.S. Pat. No. 8,094,436 B2, the contents of which are incorporated by reference herein, although a wide range of other suitable bus structures can be employed. Referring to FIGS. 2, 3 and 5, power is provided to the bus structure 6 via feeders 16, 18 and 20 for an example three-phase system. Typically, for each of the feeders 16, 18, 20 there can be a single three-pole AC circuit breaker (not shown) and a plurality of single pole AC circuit breakers (not shown) for each of the three phases. For example, each of the feeders 16, 18, 20 is a three-terminal terminal block having three power terminals (not numbered) for the three phases of the corresponding feeder.

Each of the terminals of each of the feeders 16, 18, 20 is sealed to the rear cover 12. As shown in the sectional view of FIG. 5, each of the power terminals of each of the feeders (only one power terminal of feeder 18 is shown in FIG. 5) is a solid post 18a formed from a conductive material which passes through the rear cover 12. The post 18a is coupled and sealed to the rear cover 12 through the interaction of a circular jam nut 19 and a circular o-ring 21 (shown compressed) which is compressed between the circular jam nut 19 and the rear cover 12.

Each phase of the feeders 16, 18, 20 is electrically coupled to a corresponding first plug-in member 8 in a manner such as described in the aforementioned U.S. Pat. No. 8,094,436, such that the phases of power supplied to the feeders 16, 18, 20 are electrically connected to the corresponding first plug-in members 8.

Continuing to refer to FIGS. 2, 3 and 5, a number of load connectors 22 and 24 (e.g., without limitation, sealed military MS38999 output connectors) each having a number of load pins (not numbered) are provided on, and sealed to, rear cover 12, such as through the use of an o-ring or suitable gasket member, such as gasket 25 shown in FIG. 5. The electrical bus structure 6 (e.g., a number of inner power layers thereof) suitably routes the load outputs from and the power inputs to the various circuit breakers 10. As shown in FIG. 5, the load outputs can be coupled between the electrical bus structure 6 and the load pins of each of the load connectors 22, 24 by a number of conductors or a ribbon cable 26.

Figure 6:
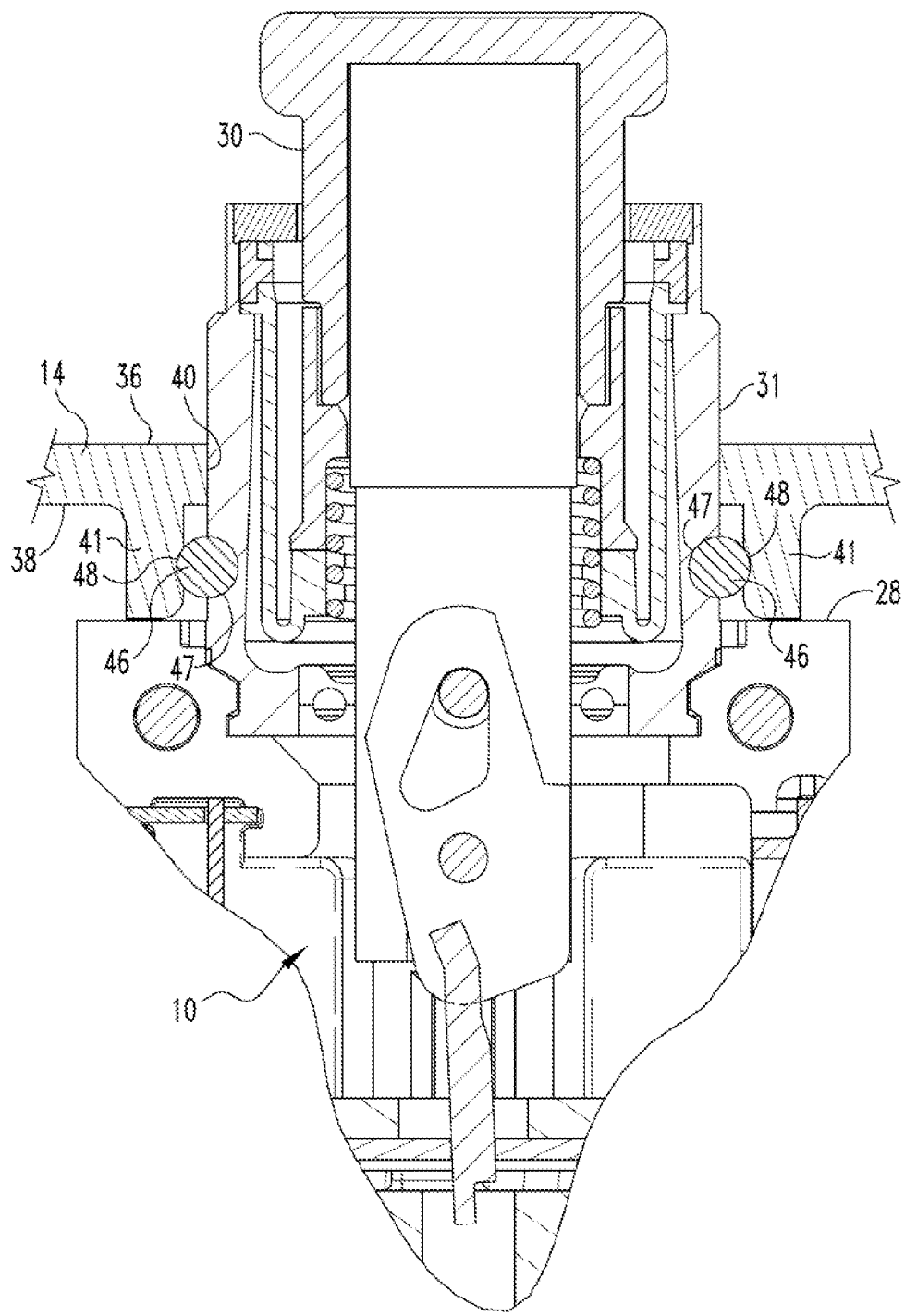
FIG. 6 is an enlarged detail view of a portion of the cross-sectional view of FIG. 5, showing the sealed interface between a circuit breaker and a faceplate.
Figure 7:
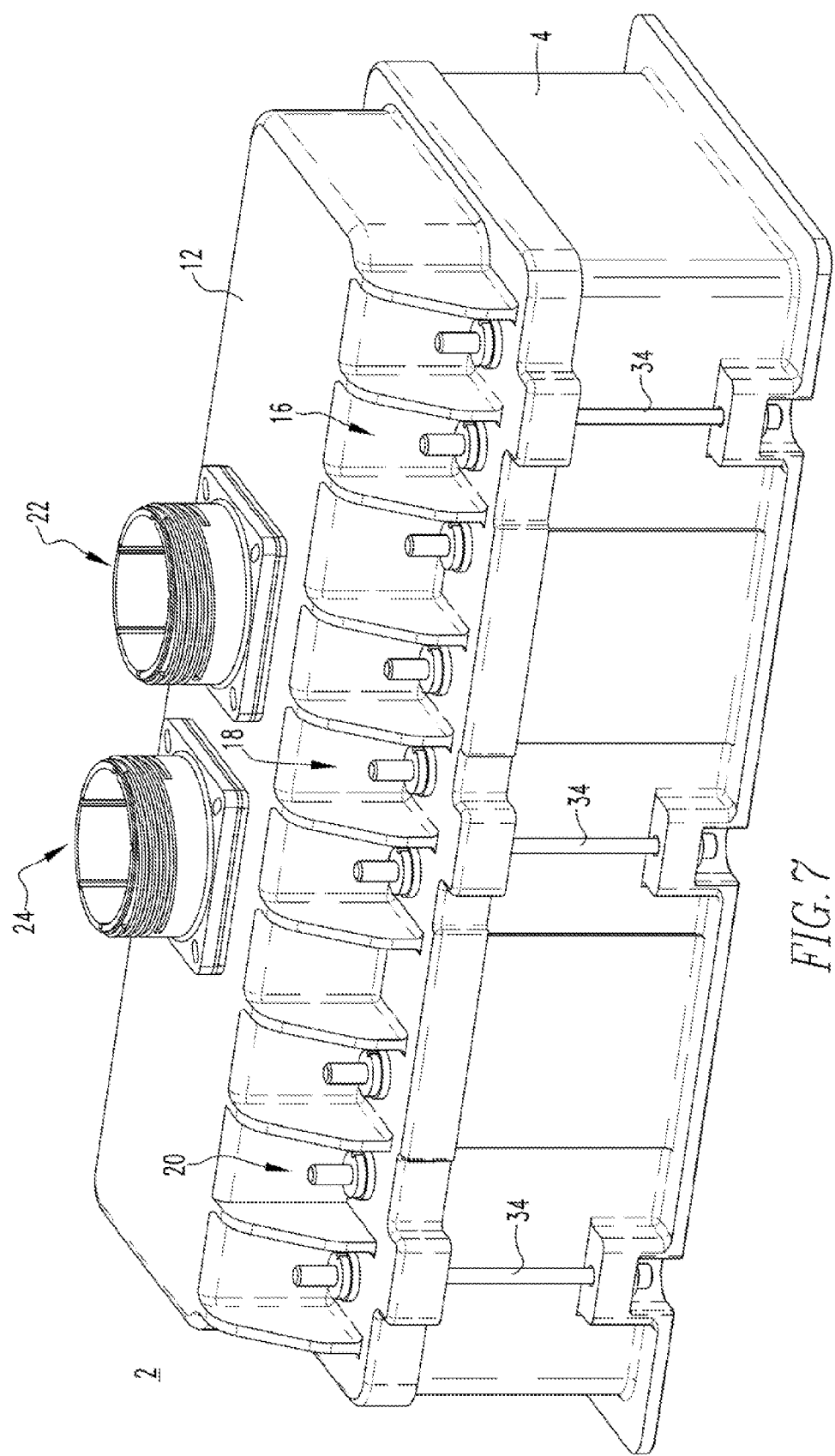
FIG. 7 is an isometric view of the sealed plug-in circuit breaker assembly of FIG. 1 showing generally the top and rear of the sealed plug-in circuit breaker assembly.

Referring to the sectional views of FIGS. 5 and 6, each of the circuit breakers 10 includes a first surface 28 (FIG. 6), a manual operator 30 (e.g., without limitation, a push-pull operating handle) disposed from the first surface 28, a neck portion 31 (FIG. 6) disposed about the manual operator 30 and extending from the first surface 28, and at least a pair of second plug-in members 32 (FIG. 5) disposed opposite the first surface 28. An example circuit breaker suitable for use in the disclosed concept is a sealed circuit breaker as generally described in U.S. Pat. No. 6,864,446 B1, which has been modified to utilize plug-in terminals suitable for engagement with first plug-in members 8.

Continuing to refer to FIGS. 5 and 6, each of the second plug-in members 32 of each of the circuit breakers 10 is mated with a corresponding one of the first plug-in members 8. Each second plug-in member 32 and the mated corresponding first plug-in member 8 cooperate to provide one of a power input (e.g., line) to or a load output (e.g., load) from the corresponding circuit breaker 10. The power input can be, for example, a single phase AC input or a single DC input. Alternatively, the power input can be, for example, a three-phase AC input as shown at three-phase feeders 16, 18 and 20.

The housing 4 includes a number of captive fasteners 34 (e.g., without limitation, stanchion bolt(s)) removably engaging the rear cover 12 in a manner such that the rear cover 12 is removably coupled to the housing 4. A rear seal member 36 (FIG. 5), such as an elastomer seal, is provided between the housing 4 and the rear cover 12 in order to prevent contaminates (e.g., without limitation, moisture, sand, dust) from entering the circuit breaker panel 2 at the junction of the housing 4 and the rear cover 12. The rear cover 12 encapsulates the wiring between the electrical bus structure 6 and the load connectors 22, 24.

Still referring to FIGS. 5 and 6, the face plate 14 includes a first surface 36, an opposite second surface 38 and a number of apertures 40 disposed through the first surface 36 and the opposite second surface 38 of the face plate 14. Face plate 14 further includes a number of collar portions 41, each disposed about a respective aperture 40 and extending from second surface 38. When the face plate 14 is coupled to the housing 4, the manual operator 30 of a circuit breaker 10 passes through a corresponding one of the apertures 40 so as to be readily accessible to an operator (as perhaps best shown in FIGS. 4 and 5). The first surface 28 of the circuit breaker 10 engages the end (not numbered) of a respective collar portion 41 of the face plate 14 in order to maintain mating of each of the number of circuit breakers 10 with the corresponding number of the first plug-in members 8.

The face plate 14 includes a number of captive fasteners 42 (e.g., without limitation, quarter-turn fastener(s)) removably engaging the housing 4 such that the face plate 14 is removably coupled to the housing 4. Such arrangement readily provides for maintenance or Inspection of one or more of the various circuit breakers 10. In order to prevent contaminates (e.g., without limitation, moisture, sand, dust) from entering the circuit breaker panel 2 at the junction of the housing 4 and the lace plate 14, a front seal member 44 (e.g., without limitation, an elastomer seal) is provided between the face plate 14 and the housing 4 to create a seal therebetween. Additionally, as shown in FIGS. 5 and 6, a breaker seal member 46 (e.g., without limitation, an o-ring) is provided about the neck portion 31 of each circuit breaker 10 in a manner such that a seal is formed between the respective collar portion 41 of each aperture 40 and the neck portion 31 of the associated circuit breaker 10. This prevents contaminates (e.g., without limitation, moisture, sand, dust) from entering the circuit breaker panel 2 between the respective collar portion 41 and the neck portion 31 of the associated breaker. In order to position seal member 46 in a desirable manner, a groove may be provided in one or both of the neck portion 31 of the breaker and/or the collar portion 41 of the face plate 14. In the example embodiment illustrated, a circular groove 47 is provided in the neck portion 31 of circuit breaker 10 in which seal member 46 is seated. Additionally, another circular groove 48, which shallower than the circular groove 47, is provided in the collar portion 41 of the face plate 14.

It is to be appreciated that the disclosed concept provides an environmentally sealed, harsh environment circuit breaker panel offering sealed sub-assemblies, sealed removable faceplate, sealed circuit, breakers, and sealed feeder terminals and connectors. This increases reliability of the panel and components, particularly when installed in harsh environments. Key performance improvements include, for example, without limitation, prevention of moisture, sand and dust intrusion and increased dielectric withstand design margin without the need of potting materials, such as RTV adhesive sealant or epoxy gap fillers, found in more conventional harsh environment circuit breaker installations.

As the disclosed concept provides for a sealed enclosure, one or both of the housing 4 and/or the rear cover 12 may include a directional vent 50 (shown schematically in FIG. 3) which allows for venting of pressure from the circuit breaker panel 2 generated by internal heating.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A sealed plug-in circuit breaker panel comprising:
   an enclosure defining an interior portion sealed from an exterior portion, the enclosure including:
   a housing;
   a face plate removably coupled to the housing, the face plate having a number of apertures formed therein; and
   a front seal member disposed between the face plate and the housing in a manner such that the face plate and the housing are sealingly engaged;
   an electrical bus structure coupled to the housing;
   a plurality of first plug-in members coupled to the electrical bus structure;
   a number of circuit breakers disposed in the enclosure, each of the number of circuit breakers comprising a manual operator and at least a pair of second plug-in members, the manual operator protruding through and extending from a corresponding one of the number of apertures of the face plate, each of the second plug-in members being electrically coupled to a corresponding one of the first plug-in members;
   a number of feeders having a number of terminals provided on, and sealed to the enclosure, each terminal of the number of terminals electrically coupled to the electrical bus structure and structured to provide power to the bus structure; and
   a number of load connectors provided on and sealed to the enclosure, each of the load conductors having a number of load pins electrically coupled to the bus structure.

2. The circuit breaker panel of claim 1 wherein:
   the face plate includes a number of collar portions each disposed about a respective aperture of the number of apertures; and
   each circuit breaker of the number of circuit breakers includes:
   a neck portion disposed about the manual operator; and
   a breaker seal member provided about the neck portion in a manner such that the neck portion and the collar portion of the corresponding one of the number of apertures are sealingly engaged.

3. The circuit breaker panel of claim 2 wherein at least one of the neck portion and the collar portion includes a circular groove, the circular groove being structured to position the breaker seal member for sealing the neck portion and the collar portion.

4. The circuit breaker panel of claim 1 wherein the face plate includes a number of captive fasteners which removably engage the housing such that the face plate is removably coupled to the housing.

5. The circuit breaker panel of claim 1 wherein the enclosure further includes a rear cover removably coupled to the housing and a rear seal member disposed between the rear cover and the housing in a manner such that the rear cover and the housing are sealingly engaged.

6. The circuit breaker panel of claim 5 wherein the housing includes a number of captive fasteners which removably engage the rear cover such that the rear cover is removably coupled to the housing.

7. The circuit breaker panel of claim 5 wherein each terminal of the number of terminals comprises a post formed from a conductive material which passes through the rear cover, the post being coupled and sealed to the rear cover via the interaction of a circular jam nut and a circular o-ring, the circular o-ring being compressed between the circular jam nut and the rear cover.

8. The circuit breaker panel of claim 5 wherein each load connector of the number of load connectors is coupled to, and sealed with, the rear cover member via an o-ring or a gasket member.

9. The circuit breaker panel of claim 1 wherein the number of load pins of each load connector are electrically coupled to the electrical bus structure by a ribbon cable.

10. The circuit breaker panel of claim 5 wherein at least one of the housing and the rear cover includes a directional vent structured to vent pressure from the interior portion of the enclosure.

* * * * *